US012331678B2

(12) United States Patent
Retersdorf et al.

(10) Patent No.: US 12,331,678 B2
(45) Date of Patent: Jun. 17, 2025

(54) BOTTOMING CYCLE FOR WASTE HEAT RECOVERY AND ENGINE COOLING

(71) Applicant: RTX CORPORATION, Farmington, CT (US)

(72) Inventors: Alan Retersdorf, Avon, CT (US); Stephen H. Taylor, East Hartford, CT (US); Nathan A. Snape, Tolland, CT (US); Oliver V. Atassi, Longmeadow, MA (US); Malcolm P. MacDonald, Bloomfield, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/242,699

(22) Filed: Sep. 6, 2023

(65) Prior Publication Data

US 2024/0084731 A1    Mar. 14, 2024

Related U.S. Application Data

(60) Provisional application No. 63/406,029, filed on Sep. 13, 2022.

(51) Int. Cl.
*F02C 7/14* (2006.01)
*F02C 6/08* (2006.01)
*F02C 9/18* (2006.01)

(52) U.S. Cl.
CPC .............. *F02C 6/08* (2013.01); *F02C 7/14* (2013.01); *F02C 9/18* (2013.01); *F05D 2220/60* (2013.01); *F05D 2260/213* (2013.01)

(58) Field of Classification Search
CPC ...... F02C 6/08; F02C 7/14; F02C 9/18; F05D 2220/60; F05D 2260/213
See application file for complete search history.

(56) References Cited

U.S. PATENT DOCUMENTS

| 11,187,156 B2 | 11/2021 | Niergarth et al. |
| 11,391,203 B2 | 7/2022 | Lafargue et al. |

(Continued)

FOREIGN PATENT DOCUMENTS

| CN | 109113866 A | 1/2019 |
| EP | 4265893 A1 | 10/2023 |
| JP | S61132727 A | 6/1986 |

OTHER PUBLICATIONS

European Search Report for European Application No. 23197258.9 mailed Feb. 8, 2024.

*Primary Examiner* — Todd E Manahan
*Assistant Examiner* — Rodolphe Andre Chabreyrie
(74) *Attorney, Agent, or Firm* — Carlson, Gaskey & Olds, P.C.

(57) ABSTRACT

A gas turbine engine assembly includes a core engine that includes a core flow path where a core airflow is compressed in a compressor section, communicated to a combustor section, mixed with fuel and ignited to generate an exhaust gas flow that is expanded through a turbine section. The turbine section is coupled to drive the compressor section through an engine drive shaft. A tap is at a location up stream of the combustor section for drawing a bleed airflow. A bleed air heat exchanger places the bleed airflow in thermal communication with an auxiliary flow for heating the bleed airflow. An exhaust heat exchanger is configured to transfer thermal energy from the exhaust gas flow into the bleed airflow.

16 Claims, 4 Drawing Sheets

(56) References Cited

U.S. PATENT DOCUMENTS

| | | |
|---|---|---|
| 2014/0182264 A1 | 7/2014 | Weisgerber et al. |
| 2018/0057171 A1* | 3/2018 | Sautron .................... F02C 9/18 |
| 2019/0383220 A1* | 12/2019 | Mackin .................. F02C 7/277 |
| 2020/0088098 A1* | 3/2020 | Roberge .................... F02C 7/16 |
| 2022/0252011 A1 | 8/2022 | Rambo et al. |

* cited by examiner

BOTTOMING CYCLE FOR WASTE HEAT RECOVERY AND ENGINE COOLING

CROSS REFERENCE TO RELATED APPLICATION

The present disclosure claims priority to U.S. Provisional Application No. 63/406,029 filed Sep. 13, 2022.

TECHNICAL FIELD

The present disclosure relates generally to a turbine engine including a waste heat recovery system for capturing thermal energy to perform useful work.

BACKGROUND

Reduction and/or elimination of carbon emissions generated by aircraft operation is a stated goal of aircraft manufacturers and airline operators. Gas turbine engines compress incoming core airflow, mix the compressed airflow with fuel that is ignited in a combustor to generate a high energy exhaust gas flow. Some energy in the high energy exhaust flow is recovered as it is expanded through a turbine section. Even with the use of alternate fuels, a large amount of energy in the form of heat is simply exhausted from the turbine section to the atmosphere. The lost heat reduces the overall efficiency of the engine.

Turbine engine manufacturers continue to seek further improvements to engine performance including improvements to reduce environmental impact while improving thermal and propulsive efficiencies.

SUMMARY

A gas turbine engine assembly according to an exemplary embodiment of this disclosure, among other possible things includes a core engine that includes a core flow path where a core airflow is compressed in a compressor section, communicated to a combustor section, mixed with fuel and ignited to generate an exhaust gas flow that is expanded through a turbine section. The turbine section is coupled to drive the compressor section through an engine drive shaft. A tap is at a location up stream of the combustor section for drawing a bleed airflow. A bleed air heat exchanger places the bleed airflow in thermal communication with an auxiliary flow for heating the bleed airflow. An exhaust heat exchanger is configured to transfer thermal energy from the exhaust gas flow into the bleed airflow.

In a further embodiment of the foregoing, the gas turbine engine includes a power turbine that includes an inlet that receives a heated bleed airflow. The power turbine is mechanically coupled to the engine drive shaft.

In a further embodiment of any of the foregoing, the gas turbine engine includes a gearbox that couples the power turbine to the engine drive shaft.

In a further embodiment of any of the foregoing, the compressor section includes a low pressure compressor that is coupled to a low pressure turbine section by the engine drive shaft.

In a further embodiment of any of the foregoing, the compressor section includes a high pressure compressor that is coupled to a high pressure turbine section by the engine drive shaft.

In a further embodiment of any of the foregoing, the compressor section includes a low-pressure compressor that is disposed upstream of the combustor section and the tap is located downstream of the low-pressure compressor and upstream of the combustor section.

In a further embodiment of any of the foregoing, the gas turbine engine includes an environmental control system that receives the auxiliary flow that is exhausted from the bleed air heat exchanger.

In a further embodiment of any of the foregoing, the gas turbine engine includes a first control device that is configured to control flow of the bleed airflow from the tap to the bleed air heat exchanger and a controller that is programmed to control operation of the first control device in response to a control input. The control input is indicative of an engine operating condition.

In a further embodiment of any of the foregoing, the gas turbine engine includes a second control device that is configured to control the combusted gas flow through the exhaust heat exchanger and a controller that is programmed to control operation of the second control device in response to a control input. The control input is indicative of an engine operating condition.

In a further embodiment of any of the foregoing, the gas turbine engine includes a second bleed air heat exchanger that places the bleed air flow in thermal communication with a heated engine fluid flow.

In a further embodiment of any of the foregoing, the second bleed air heat exchanger is in series with the first bleed air heat exchanger.

In a further embodiment of any of the foregoing, the second bleed air heat exchanger is in parallel with the first bleed air heat exchanger.

In a further embodiment of any of the foregoing, the gas turbine engine includes a coolant loop system that includes a coolant heat exchanger that places a coolant flow in thermal communication with the bleed airflow for preheating the bleed airflow prior to communication of the bleed airflow to the exhaust heat exchanger.

A waste heat recovery system for a gas turbine engine according to another exemplary embodiment of this disclosure, among other possible things includes a first tap that draws bleed airflow from a core flow path up stream of a combustor section of the gas turbine engine, a bleed air heat exchanger that places the bleed airflow in thermal communication with an auxiliary flow for heating the bleed airflow, and an exhaust heat exchanger that is configured to transfer thermal energy from the exhaust gas flow into the bleed airflow. The waste heat recovery system further includes a power turbine that includes an inlet that receives a heated bleed airflow. The power turbine is configured to generate a mechanical power output.

In a further embodiment of any of the foregoing, the waste heat recovery system includes an auxiliary system that receives the auxiliary flow that is exhausted from the bleed air heat exchanger.

In a further embodiment of any of the foregoing, the waste heat recovery system includes a first control device that is configured to control flow of the bleed airflow from the first tap to the bleed air heat exchanger and a controller that is programmed to control operation of the first control device in response to a control input.

In a further embodiment of any of the foregoing, the waste heat recovery system includes a coolant loop system with a coolant heat exchanger that places a coolant flow in thermal communication with the bleed airflow.

A method of operating a gas turbine engine assembly according to another exemplary embodiment of this disclosure, among other possible things includes generating an exhaust gas flow by igniting a fuel mixed with a core airflow, communicating a portion of the core airflow as a bleed airflow through a tap located upstream of a combustor section, heating the bleed airflow with an auxiliary flow for an auxiliary system that is within a bleed air heat exchanger, heating bleed air flow in an exhaust heat exchanger that is in thermal communication with the combusted gas flow, and generating shaft power by expanding at least a portion of heated bleed airflow through a power turbine.

In a further embodiment of any of the foregoing, the method includes coupling an engine shaft to the power turbine and applying a drive input to the engine shaft with the power turbine.

In a further embodiment of any of the foregoing, the method includes transferring thermal energy from the exhaust gas flow through a coolant loop to the bleed air flow.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
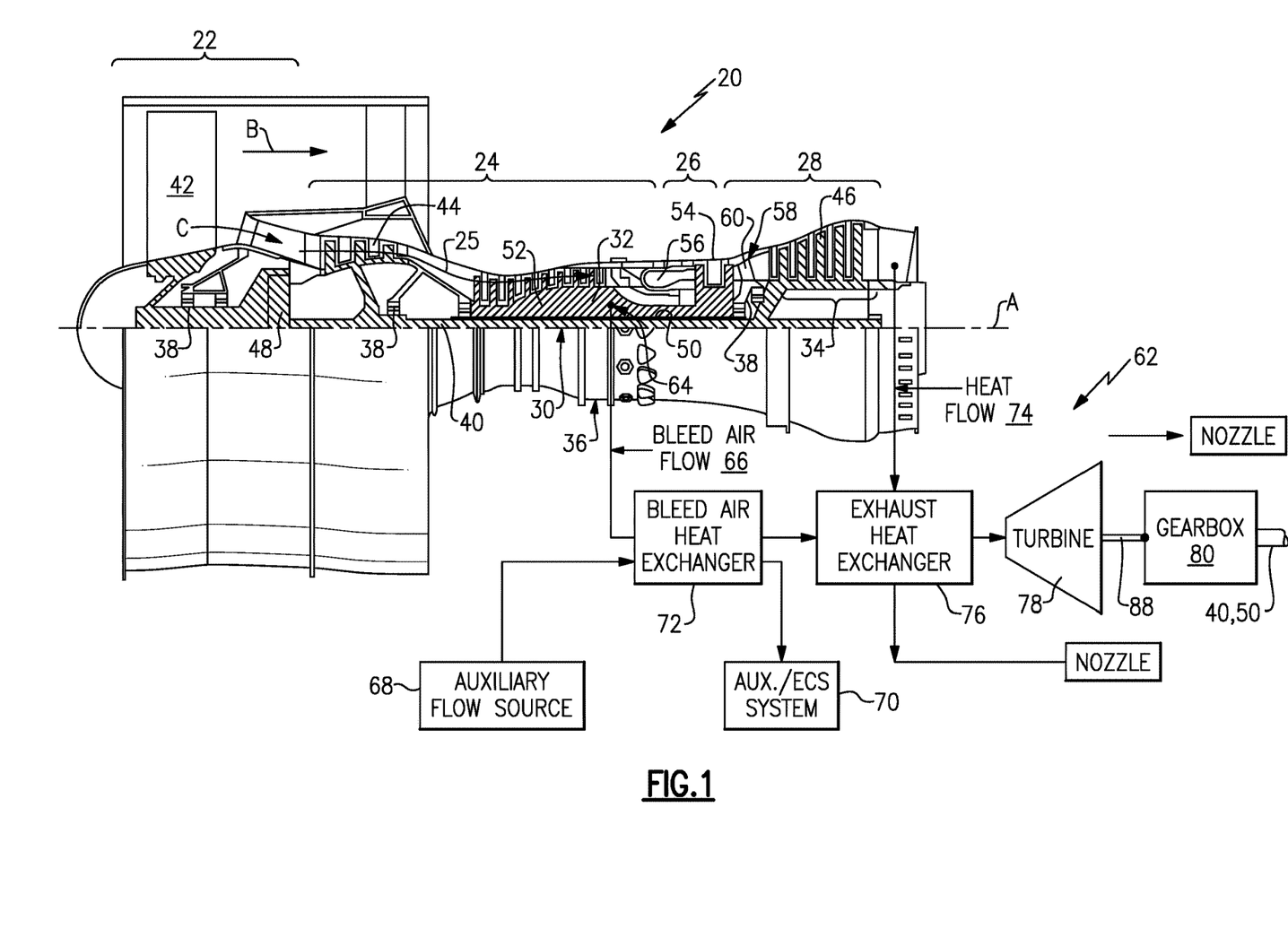
FIG. 1 is a schematic view of an example turbine engine embodiment.

FIG. 1 schematically illustrates an example gas turbine engine 20 that includes a fan section 22, a compressor section 24, a combustor section 26 and a turbine section 28. The fan section 22 drives inlet air along a bypass flow path B, while the compressor section 24 draws air in along a core flow path C where a core airflow 25 is compressed and communicated to a combustor section 26. In the combustor section 26, air is mixed with fuel and ignited to generate a high energy hot exhaust gas flow 74 that expands through the turbine section 28 where energy is extracted and utilized to drive the fan section 22 and the compressor section 24.

Although the disclosed non-limiting embodiment depicts a two-spool turbofan gas turbine engine, it should be understood that the concepts described herein are not limited to use with two-spool turbofans as the teachings may be applied to other types of turbine engines; for example a turbine engine including a three-spool architecture in which three spools concentrically rotate about a common axis and where a low spool enables a low-pressure turbine to drive a fan via a gearbox, an intermediate spool that enables an intermediate pressure turbine to drive a first compressor of the compressor section, and a high spool that enables a high-pressure turbine to drive a high-pressure compressor of the compressor section.

The example engine 20 generally includes a low-speed spool 30 and a high-speed spool 32 mounted for rotation about an engine central longitudinal axis A relative to an engine static structure 36 via several bearing systems 38. It should be understood that various bearing systems 38 at various locations may alternatively or additionally be provided.

The low-speed spool 30 generally includes an inner shaft 40 that connects a fan 42 and a low-pressure (or first) compressor section 44 to a low-pressure (or first) turbine section 46. The inner shaft 40 drives the fan section 22 through a speed change device, such as a geared architecture 48, to drive the fan section 22 at a lower speed than the low-speed spool 30. The high-speed spool 32 includes an outer shaft 50 that interconnects a high-pressure (or second) compressor section 52 and a high-pressure (or second) turbine section 54. The inner shaft 40 and the outer shaft 50 are concentric and rotate via the bearing systems 38 about the engine central longitudinal axis A.

A combustor 56 is arranged between the high-pressure compressor 52 and the high-pressure turbine 54. In one example, the high-pressure turbine 54 includes at least two stages to provide a double stage high-pressure turbine 54. In another example, the high-pressure turbine 54 includes only a single stage. As used herein, a "high-pressure" compressor or turbine experiences a higher pressure than a corresponding "low-pressure" compressor or turbine.

The example low-pressure turbine 46 has a pressure ratio that is greater than about 5. The pressure ratio of the example low-pressure turbine 46 is measured prior to an inlet of the low-pressure turbine 46 as related to the pressure measured at the outlet of the low-pressure turbine 46 prior to an exhaust nozzle.

A mid-turbine frame 58 of the engine static structure 36 is arranged generally between the high-pressure turbine 54 and the low-pressure turbine 46. The mid-turbine frame 58 further supports bearing systems 38 in the turbine section 28 as well as setting airflow entering the low-pressure turbine 46.

The core airflow 25 through the core airflow path C is compressed by the low-pressure compressor 44 then by the high-pressure compressor 52 mixed with fuel and ignited in the combustor 56 to produce high energy hot exhaust gas flow 74 that is expanded through the high-pressure turbine 54 and low-pressure turbine 46. The mid-turbine frame 58 includes vanes 60, which are in the core airflow path and function as an inlet guide vane for the low-pressure turbine 46. Utilizing the vane 60 of the mid-turbine frame 58 as the inlet guide vane for low-pressure turbine 46 decreases the length of the low-pressure turbine 46 without increasing the axial length of the mid-turbine frame 58. Reducing or eliminating the number of vanes in the low-pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low-pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment, the low fan pressure ratio is less than about 1.45.

"Low corrected fan tip speed" is the actual fan tip speed in ft/sec divided by an industry standard temperature correction of [(Tram ° R)/(518.7° R)]0.5. The "Low corrected fan tip speed", as disclosed herein according to one non-limiting embodiment, is less than about 1150 ft/second.

The example gas turbine engine includes the fan section 22 that comprises in one non-limiting embodiment less than about 26 fan blades 42. In another non-limiting embodiment, the fan section 22 includes less than about 20 fan blades 42. Moreover, in one disclosed embodiment the low-pressure turbine 46 includes no more than about 6 turbine rotors schematically indicated at 34. In another non-limiting example embodiment, the low-pressure turbine 46 includes about 3 turbine rotors. A ratio between the number of fan blades 42 and the number of low-pressure turbine rotors is between about 3.3 and about 8.6. The example low-pressure turbine 46 provides the driving power to rotate the fan section 22 and therefore the relationship between the number of turbine rotors 34 in the low-pressure turbine 46 and the number of blades 42 in the fan section 22 disclose an example gas turbine engine 20 with increased power transfer efficiency.

Thermal energy produced through the combustion process is wasted as the high energy exhaust gas flow is vented to atmosphere after expansion through the turbine section 28. This thermal energy vented to atmosphere can be used to drive other systems to produce power.

The example gas turbine engine 20 includes a waste heat recovery system 62 that utilizes thermal energy from an exhaust gas flow 74 to heat a bleed airflow 66 drawn from a first tap 64. The bleed airflow 66 is preheated in a bleed airflow heat exchanger 72 in thermal communication with an auxiliary flow 68 used for an auxiliary system 70 prior to being heated in an exhaust heat exchanger 76. The auxiliary flow 68 transfers thermal energy into the bleed airflow 66 prior to a final heating in the exhaust heat exchanger 76. The preheating can provide for differently configured exhaust heat exchanger 76 that provides additional mounting capabilities. The auxiliary system 70 that receives the air from the auxiliary flow 68 can be utilized for an environmental control system (ECS) or any other aircraft or engine system that uses such an airflow.

The first tap 64 is an opening that provides for splitting a portion of a core airflow from the core flow path C. In one example embodiment, the first tap is a splitter that diverts a desired amount of the core flow as the bleed airflow 66. Other splitter and tap configurations as are needed to direct a desired amount of core airflow as a bleed airflow 66 could be utilized within the scope and contemplation of this disclosure.

The heated bleed airflow exhausted from the exhaust heat exchanger 76 is expanded through a power turbine 78 to drive a shaft 88. In one example embodiment, the shaft 88 is coupled to one of the engine shafts 40, 50. The shaft 88 may be coupled directly to either or both the engine shafts 40, 50 or through a gearbox 80. The shaft 88 may also be coupled to drive a generator, pump, auxiliary gearbox or any other device utilized to operate engine or aircraft systems. The work produced by the power turbine 78 reduces the load on the core engine and thereby provides increased engine thermal efficiency.

Figure 2:
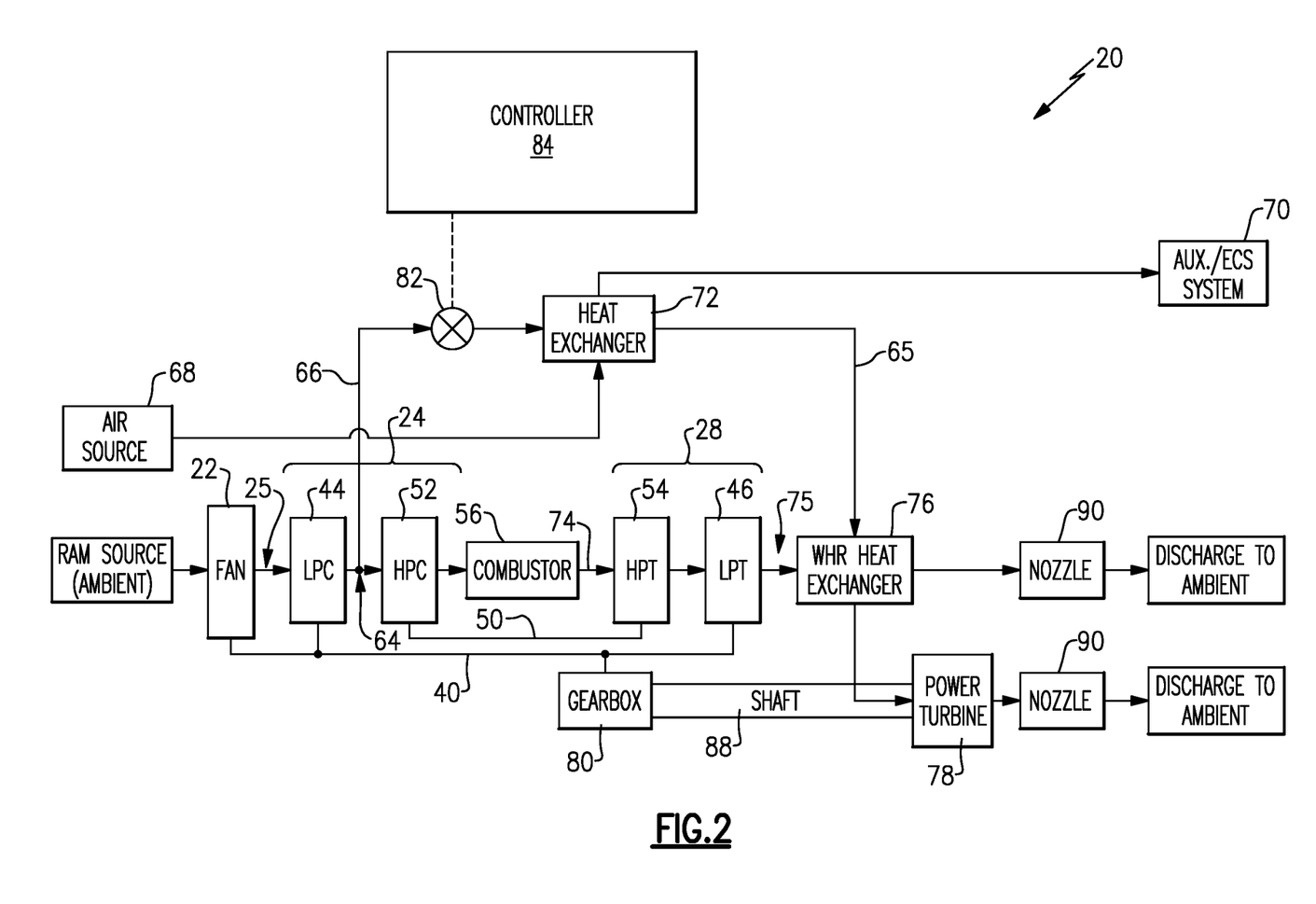
FIG. 2 is a simplified schematic view of the example turbine engine embodiment of FIG. 1.

Referring to FIG. 2, with continued reference to FIG. 1, the example engine 20 is shown schematically with the bleed air heat exchanger 72 receiving a bleed airflow 66 from a first tap 64. In one disclosed embodiment, the first tap 64 draws the bleed airflow 66 from a location downstream of the LPC 44. It should be appreciated that although a disclosed example embodiment is disposed downstream of the LPC 44, other locations within the compressor section 24, or at the outlet of the fan 22, may also be utilized to draw the bleed airflow 66. The location of the first tap 64 may be selected to provide the bleed airflow 66 at a desired temperature and pressure. Moreover, although a single tap 64 is shown by example, bleed air may be drawn from multiple locations within the compressor section 24 or at the fan 22 outlet within the scope and contemplation of this disclosure.

The original source of auxiliary flow 68, in one example embodiment, may be a dedicated scoop, an aircraft nacelle structure, or areas of the engine 20 that provide a flow at an elevated temperature. The bleed airflow 66 is preheated by the auxiliary flow 68 in the bleed airflow heat exchanger 72. The preheated bleed airflow indicated at 65 is then communicated to the exhaust heat exchanger 76 for additional heating by an exhaust gas flow 76 exiting the turbine section 28. The heated bleed airflow is then expanded through the power turbine 78.

The power turbine 78 generates a work output that offsets loads on the core engine. In one example embodiment, the power turbine 78 drives a shaft 88 coupled to one of the engine shafts through a gearbox 80. In the illustrated example embodiment, the gearbox 80 is coupled to the inner shaft 40 such that the power turbine 78 may input power to the low spool to supplement engine operation. The gearbox 80 is configured to prevent back driving of the power turbine 78 by the inner shaft 40 and may also provide a desired gear ratio corresponding to desired engine operation and power input. In another embodiment, the power turbine 78 may be directly connected to either inner shaft 40, 50 without an intermediate gearbox.

A first control device 82 is provided to control the flow of bleed airflow 66 from the first tap 74. In some engine operating conditions, engine efficiencies may be optimized by limiting and/or completely stopping bleed air from being drawn from the compressor section 24. Accordingly, a controller 84 governs operation of the first device 82 to control how and when bleed airflow 66 is tapped from the compressor section. The controller 84 may control the control device 82 and thereby the flow of bleed air 66 based on real time engine operating conditions and/or according to a predefined schedule. In any control scheme, the controller 84 is programmed to control the flow of bleed airflow 66 desired to efficiently supplement engine operation by powering the power turbine 78. The controller 84 may be a stand-alone controller for the waste heat recovery system 62 or part of an overall engine controller. Additionally, the controller 84 may be implemented as a software program operated by the engine controller.

In the disclosed engine example, the auxiliary system is an environmental control system 70 that provides an airflow to an aircraft cabin. The bleed air flow 66 is therefore tailored to provide for at least a portion of the temperature change required in the flow prior to delivery to the environmental control system 70. Other systems and devices may be included to further tailor the conditions of airflow received and utilized by the environmental control system 70.

The bleed airflow exhausted from the power turbine 78 is exhausted through a nozzle 90 to the ambient environment. Similarly, the exhaust gas flow exhausted from the exhaust heat exchanger 76 is exhausted through the nozzle 90 to the ambient environment. The nozzles 90 are illustrated separately for each of the bleed air flow and the exhaust gas flow 75 and may be a single nozzle and/or several different outlets within the scope and contemplation of this disclosure.

Figure 3:
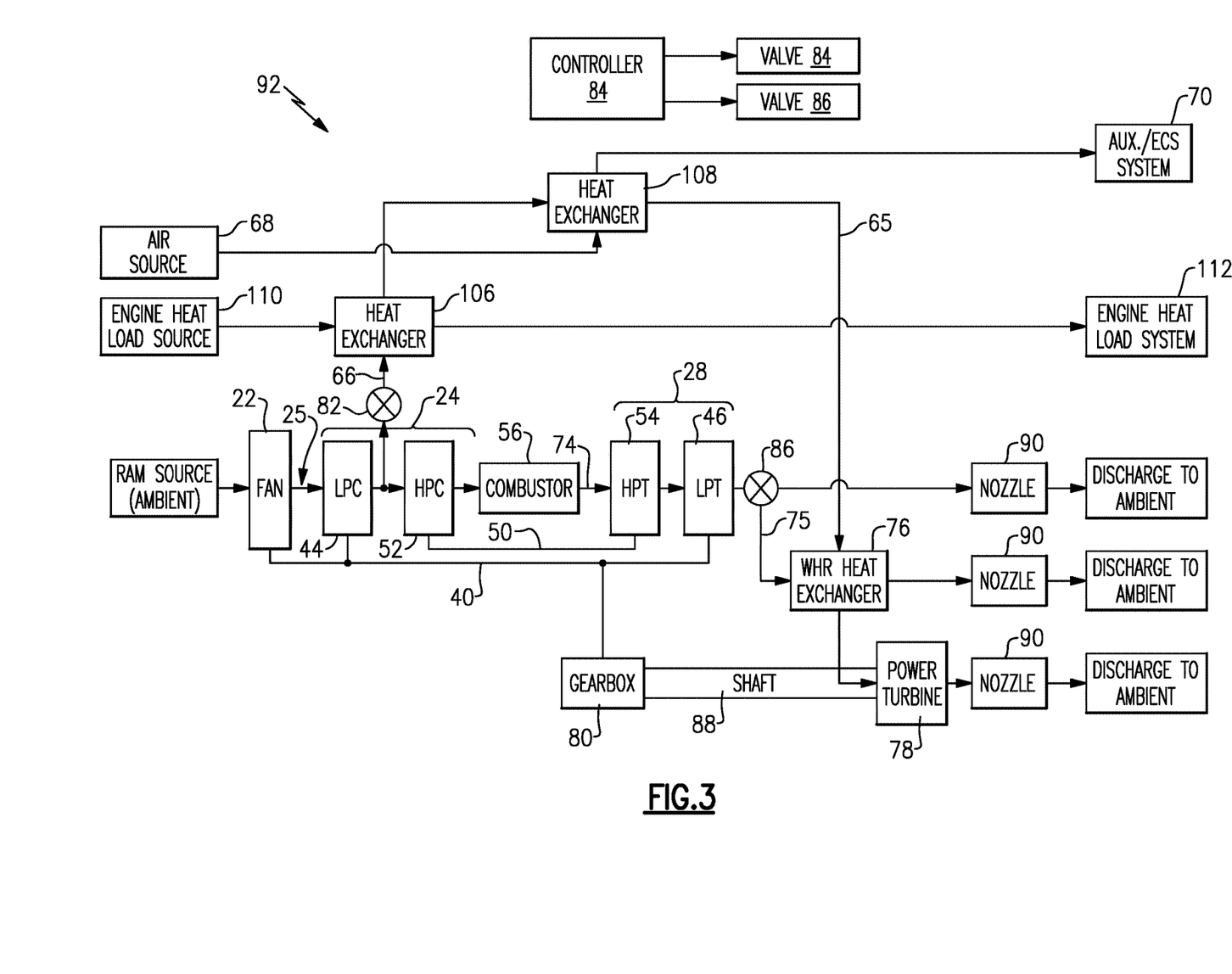
FIG. 3 is a schematic view of another example turbine engine embodiment configured for an example operating condition.

Referring to FIG. 3, another example waste heat recovery system 92 is schematically shown and includes a second control device 86 for controlling an exhaust gas flow 75 to the exhaust heat exchanger 76. The bleed airflow 66 is still preheated in a bleed air heat exchanger 72 prior to entering the exhaust heat exchanger 76.

The second control device 86 is operated by the controller 84 according to a programmed control schedule and/or based on current measured engine operating conditions. Accordingly, when bleed airflow 65 is communicated to the exhaust heat exchanger 76, the control device 86 can be opened to place the exhaust gas flow 75 in thermal communication with the bleed air flow 65. Moreover, the control device 86 may be a proportional device to provide for control of the exhaust gas flow 75 to control thermal energy input into the bleed airflow 65. Proportioning of the exhaust gas flow 75 may be used to control a final temperature of the bleed airflow 65 communicated to the power turbine 78. The control of temperature of the bleed airflow 65 to the power turbine may provide for control of power turbine operation and thereby power input into the engine shafts.

Additionally, the bleed airflow 66 is shown communicated through a first heat exchanger 106 and a second heat exchanger 108 prior to communication to the exhaust heat exchanger 76. The bleed airflow 66 may accumulate heat from various engine and auxiliary systems before being placed in thermal communication with the exhaust gas flow 75 in the exhaust heat exchanger 76.

In one disclosed example, the first heat exchanger 106 transfers thermal energy into the coolant from an engine heat load source 110. The engine heat load source 110 may be from any source such as for example, a fuel flow or a lubricant flow. Heat may be input into the bypass air flow 66 to cool the lubricant flow prior to recirculating lubricant to the various engine bearing and gear systems. It should be appreciated that although example flows that may provide for transfer of thermal energy are disclosed, other flows may be utilized to achieve desired cooling and heating within the scope and contemplation of this disclosure.

Figure 4:
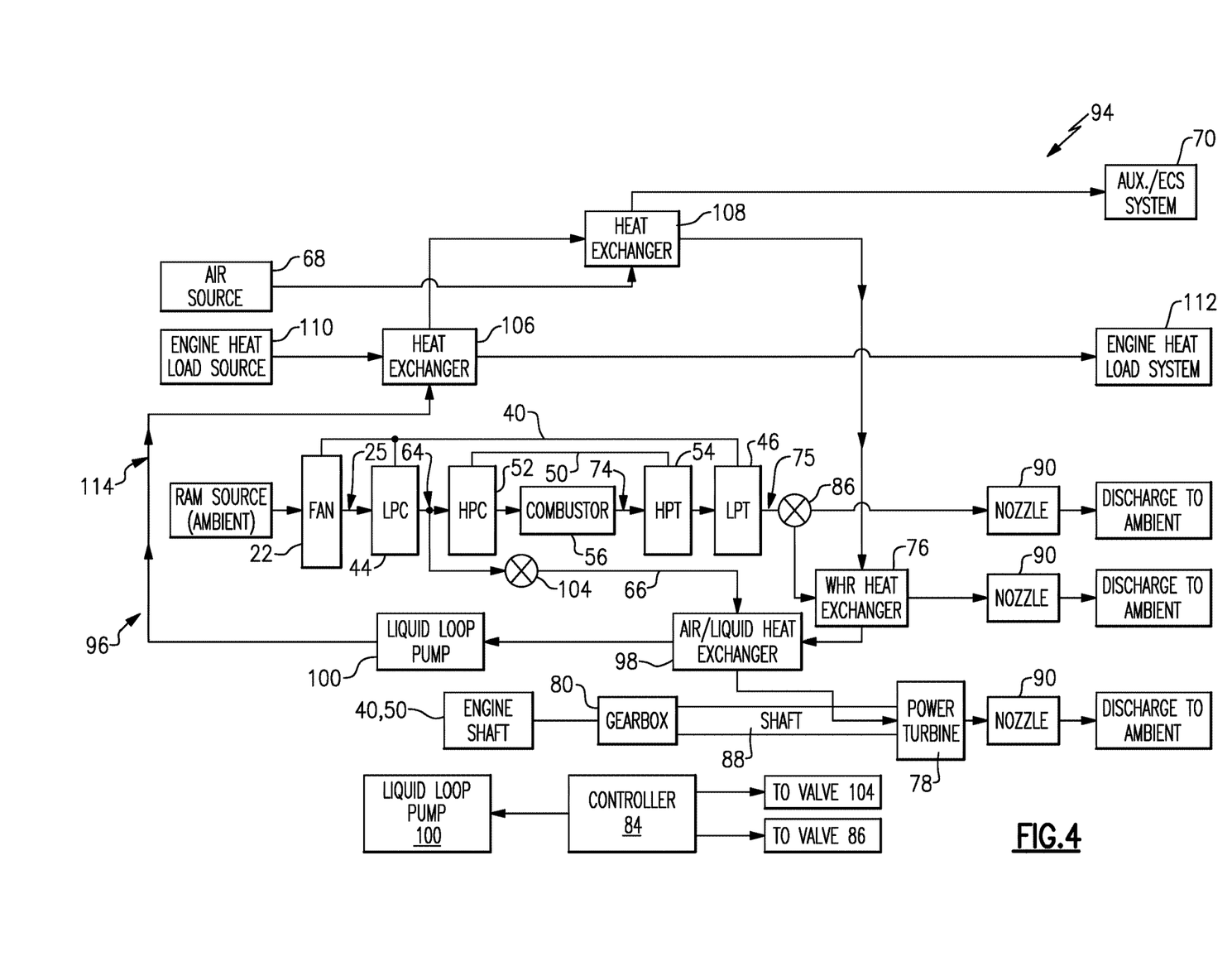
FIG. 4 is a schematic view of the example turbine engine embodiment of FIG. 3 configured for another example operating condition.

Referring to FIG. 4 with continued reference to FIG. 1, another example waste heat recovery system is shown and schematically indicated at 94. The waste heat recovery system 94 includes a closed coolant loop 96. The coolant loop 96 circulates a coolant through a closed system to transfer thermal energy between different devices and systems. The coolant may be a liquid coolant that transforms between different phases or any other cooling medium circulated in a closed loop.

The coolant loop 96 includes a pump 100 that circulates coolant through a first heat exchanger 106, a second heat exchanger 108, an exhaust heat exchanger 76 and an air/liquid heat exchanger 98. Bleed airflow 66 is heated in the air/liquid heat exchanger 98 and exhausted to drive the power turbine. 78. The heated bleed airflow 66 drives the power turbine 78 to generate a power output that is used, in one example, to input power to one of the engine shafts 40, 50.

The coolant flow, schematically indicated at 114 accumulates heat from various engine and auxiliary systems before being placed in thermal communication with the exhaust gas flow 75 in the exhaust heat exchanger 76. In one disclosed example, the first heat exchanger 106 transfers thermal energy into the coolant from an engine heat load source 110. The engine heat load source 110 may be from any source such as for example, a fuel flow or a lubricant flow. In each instance, thermal energy is transferred between the flow and the coolant 114. The heat exchanger 108 may provide for cooling of the coolant 114 after being heated by the exhaust gas flow 75. For example, heat may be input into a fuel flow to aid the combustion process and thereby cool the coolant 114. Heat may be input into the coolant 114 to cool the lubricant flow prior to recirculating lubricant to the various engine bearing and gear systems. It should be appreciated that although example flows that may provide for transfer of thermal energy are disclosed, other flows may be utilized to achieve desired cooling and heating within the scope and contemplation of this disclosure.

In this disclosed example, the bleed airflow 66 is heated by the air/liquid heat exchanger 98 and exhausted directly to the power turbine 78. The coolant loop 96 provides for the transfer of thermal energy into the bleed airflow 66. Thermal energy from the exhaust gas flow 75 is input into the bleed airflow 66 through the coolant 114. Moreover, the coolant 114 accumulates thermal energy in the first and second heat exchangers 106, 108. The accumulated thermal energy recovered from the various systems is input into the coolant loop 96 to provide for distribution as desired throughout the engine. In this example, the thermal energy is input into the bleed airflow 66 and recovered by expansion through the power turbine 78 to generate a mechanical work output.

The controller 84 controls operation of the bleed air control device 104 and the pump 100 to provide control of the power turbine 78. The pump 100 may be operated proportionally to adjust a temperature of the coolant 114 by adjusting a flow rate. The device 104 and the device 86 may be adjusted to close off or proportionally control bleed airflow and exhaust gas flow as desired to adjust pressures and temperatures. The range of operation of the devices 104, 86 and the pump 100 may be adjusted based in current engine conditions and/or according to a predefined operating schedule.

Accordingly, the disclosed example waste heat recovery systems provide for the accumulation, transfer and recovery of thermal energy from the exhaust gas flow and other engine and auxiliary systems to drive a power turbine to produce a mechanical output that is utilized to supplement engine power output.

Accordingly, the disclosed assemblies provide for the advantageous reclamation of heat energy for production of power and thereby improved overall engine efficiency.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A gas turbine engine assembly comprising:
a core engine including a core flow path where a core airflow is compressed in a compressor section, communicated to a combustor section, mixed with fuel and ignited to generate an exhaust gas flow that is expanded through a turbine section, wherein the turbine section is coupled to drive the compressor section through an engine drive shaft;
a tap at a location up stream of the combustor section for drawing a bleed airflow;
a bleed air heat exchanger placing the bleed airflow in thermal communication with an auxiliary flow for heating the bleed airflow, wherein the auxiliary flow comprises a flow at an elevated temperature that is greater than the bleed airflow and is communicated to an environmental control system after the bleed air heat exchanger;
an exhaust heat exchanger configured to transfer thermal energy from the exhaust gas flow into the bleed airflow; and
a first control device configured to control flow of the bleed airflow from the tap to the bleed air heat exchanger and a controller programmed to control operation of the first control device in response to a control input, wherein the control input is indicative of an engine operating condition.

2. The gas turbine engine as recited in claim 1, including a power turbine including an inlet receiving a heated bleed airflow, wherein the power turbine is mechanically coupled to the engine drive shaft.

3. The gas turbine engine as recited in claim 2, including a gearbox coupling the power turbine to the engine drive shaft.

4. The gas turbine engine as recited in claim 2, wherein the compressor section includes a low pressure compressor coupled to a low pressure turbine section by the engine drive shaft.

5. The gas turbine engine as recited in claim 2, wherein the compressor section includes a high pressure compressor coupled to a high pressure turbine section by the engine drive shaft.

6. The gas turbine engine as recited in claim 1, wherein the compressor section includes a low-pressure compressor disposed upstream of the combustor section and the tap is located downstream of the low-pressure compressor and upstream of the combustor section.

7. The gas turbine engine assembly as recited in claim 1, including an environmental control system receiving the auxiliary flow exhausted from the bleed air heat exchanger.

8. The turbine engine as recited in claim 1, wherein the controller is further programmed to control a power turbine to supplement engine operation by supplying power to the engine drive shaft.

9. A waste heat recovery system for a gas turbine engine, the waste heat recovery system comprising:
a first tap drawing bleed airflow from a core flow path up stream of a combustor section of the gas turbine engine;
a bleed air heat exchanger placing the bleed airflow in thermal communication with an auxiliary flow for heating the bleed airflow, wherein the auxiliary flow comprises a flow at an elevated temperature that is greater than the bleed airflow and is communicated to an environmental control system after the bleed air heat exchanger; and
an exhaust heat exchanger configured to transfer thermal energy from the exhaust gas flow into the bleed airflow; and
a power turbine including an inlet receiving a heated bleed airflow, wherein the power turbine is configured to generate a mechanical power output;
a first control device configured to control flow of the bleed airflow from the first tap to the bleed air heat exchanger; and
a controller programmed to control operation of the first control device in response to a control input.

10. The waste heat recovery system as recited in claim 9, including an auxiliary system receiving the auxiliary flow exhausted from the bleed air heat exchanger.

11. The waste heat recovery system as recited in claim 10, including a coolant loop system with a coolant heat exchanger that places a coolant flow in thermal communication with the bleed airflow.

12. The waste heat recovery system as recited in claim 9, further comprising a gearbox coupled to the power turbine and configured to supplement power to an engine shaft of a core engine.

13. A method of operating a gas turbine engine assembly comprising:
generating an exhaust gas flow by igniting a fuel mixed with a core airflow in a core engine, wherein the core engine includes a compressor section coupled to a turbine section through an engine shaft;
communicating a portion of the core airflow as a bleed airflow through a tap located upstream of a combustor section;
heating the bleed airflow with an auxiliary flow for an auxiliary system within a bleed air heat exchanger, wherein the auxiliary flow comprises a flow at an elevated temperature that is greater than the bleed airflow and is communicated to an environmental control system after the bleed air heat exchanger;
heating bleed airflow in an exhaust heat exchanger in thermal communication with the combusted gas flow; and
generating shaft power by expanding at least a portion of heated bleed airflow through a power turbine;
coupling the engine shaft to the power turbine and applying a drive input to the engine shaft with the power turbine.

14. The method as recited in claim 13, including transferring thermal energy from the exhaust gas flow through a coolant loop to the bleed air flow.

15. The method as recited in claim 13, further comprising providing a gearbox coupling the power turbine to the engine shaft and preventing back driving of the power turbine by the engine shaft.

16. The method as recited in claim 13, further comprising controlling the bleed airflow with a first control device configured to control flow of the bleed airflow from the tap to the bleed air heat exchanger and a controller programmed to control operation of the first control device in response to a control input, wherein the control input is indicative of an engine operating condition.

* * * * *